(12) United States Patent
Singh et al.

(10) Patent No.: US 12,003,370 B2
(45) Date of Patent: Jun. 4, 2024

(54) DYNAMIC INTERNET OF THINGS DEVICE RECORDS FOR USE IN VALIDATING COMMUNICATIONS FROM INTERNET OF THINGS DEVICES SUBJECT TO DATA DRIFT

(71) Applicant: BANK OF AMERICA CORPORATION, Charlotte, NC (US)

(72) Inventors: Shailendra Singh, Maharashtra (IN); Vasuki Anand, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/696,141

(22) Filed: Mar. 16, 2022

(65) Prior Publication Data

US 2023/0300027 A1    Sep. 21, 2023

(51) Int. Cl.
*H04L 41/0853*    (2022.01)
*H04L 9/40*    (2022.01)

(52) U.S. Cl.
CPC ...... *H04L 41/0853* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 9,849,364 B2 | 12/2017 | Tran et al. | |
| 10,022,613 B2 | 7/2018 | Tran et al. | |
| 10,195,513 B2 | 2/2019 | Tran et al. | |
| 10,469,248 B2 | 11/2019 | Chalakudi et al. | |
| 10,601,597 B2 | 3/2020 | Callan et al. | |
| 10,642,967 B2 | 5/2020 | Balaraman et al. | |
| 10,673,617 B1 | 6/2020 | Antoniou et al. | |
| 10,749,677 B2 | 8/2020 | Agrawal et al. | |
| 10,819,684 B2 | 10/2020 | Ramos et al. | |
| 11,012,228 B2 | 5/2021 | Mercuri et al. | |
| 11,130,042 B2 | 9/2021 | Tran et al. | |

(Continued)

OTHER PUBLICATIONS

Singh, Shailendra; System and Method for Intelligent Validation of Communications Initiated by Internet of Things Devices; U.S. Appl. No. 17/696,221, filed Mar. 16, 2022.

(Continued)

*Primary Examiner* — Kevin T Bates
*Assistant Examiner* — Emad Siddiqi

(57) ABSTRACT

A system includes a memory, and a processor. The processor receives a request to register a device. In response, the processor extracts a set of parameters from the device, and stores a baseline record associated with the device, which includes the set of parameters, in the memory. The processor determines that an update to the device modified the set of parameters. In response, the processor extracts the modified set of parameters from the device, and stores a new record associated with the device, which includes the modified set of parameters, in the memory. The baseline record was used to validate an identity of the device prior to the processor determining that the update modified the set of parameters. The new record is used to validate the identity of the device subsequent to the processor determining that the update modified the set of parameters.

17 Claims, 3 Drawing Sheets

(56) References Cited

U.S. PATENT DOCUMENTS

| | | |
|---|---|---|
| 11,188,977 B2 | 11/2021 | Youb et al. |
| 11,195,365 B2 | 12/2021 | Jiang |
| 2015/0379510 A1 | 12/2015 | Smith |
| 2016/0088326 A1* | 3/2016 | Solomon .............. H04N 21/254 |
| | | 725/12 |
| 2016/0358186 A1 | 12/2016 | Radocchia et al. |
| 2017/0132619 A1 | 5/2017 | Miller et al. |
| 2017/0345019 A1 | 11/2017 | Radocchia et al. |
| 2018/0133583 A1 | 5/2018 | Tran et al. |
| 2018/0247191 A1 | 8/2018 | Katz et al. |
| 2018/0264347 A1 | 9/2018 | Tran et al. |
| 2018/0337769 A1 | 11/2018 | Gleichauf |
| 2019/0012637 A1 | 1/2019 | Gillen |
| 2019/0019144 A1 | 1/2019 | Gillen |
| 2019/0026716 A1 | 1/2019 | Anbukkarasu et al. |
| 2019/0036906 A1 | 1/2019 | Biyani et al. |
| 2019/0116142 A1 | 4/2019 | Chalakudi et al. |
| 2019/0303942 A1 | 10/2019 | Balaraman et al. |
| 2019/0349426 A1 | 11/2019 | Smith et al. |
| 2019/0355025 A1* | 11/2019 | Yang ........................ H04L 9/50 |
| 2019/0361917 A1 | 11/2019 | Tran et al. |
| 2019/0373472 A1 | 12/2019 | Smith et al. |
| 2019/0379699 A1 | 12/2019 | Katragadda et al. |
| 2020/0013050 A1 | 1/2020 | Finlow-Bates et al. |
| 2020/0042960 A1 | 2/2020 | Cook et al. |
| 2020/0042971 A1 | 2/2020 | Eby et al. |
| 2020/0067708 A1* | 2/2020 | Subba .................. H04L 9/3226 |
| 2020/0117690 A1 | 4/2020 | Tran et al. |
| 2020/0250174 A1* | 8/2020 | Padmanabhan ..... G06F 16/2365 |
| 2020/0372154 A1 | 11/2020 | Bacher et al. |
| 2021/0019444 A1 | 1/2021 | Miller |
| 2021/0042426 A1 | 2/2021 | Krishnaswamy et al. |
| 2021/0166311 A1 | 6/2021 | Cella |
| 2021/0297424 A1 | 9/2021 | Biyani et al. |
| 2022/0004926 A1 | 1/2022 | Cella |
| 2022/0006705 A1 | 1/2022 | Padmanabhan |
| 2022/0029810 A1 | 1/2022 | Tang et al. |
| 2022/0100717 A1* | 3/2022 | Maschek ................ H04L 9/3236 |

OTHER PUBLICATIONS

Singh, Shailendra; System and Method for Automatic Identification of Unauthorized Updates to Internet of Things Devices; U.S. Appl. No. 17/696,303, filed Mar. 16, 2022.

* cited by examiner

DYNAMIC INTERNET OF THINGS DEVICE RECORDS FOR USE IN VALIDATING COMMUNICATIONS FROM INTERNET OF THINGS DEVICES SUBJECT TO DATA DRIFT

TECHNICAL FIELD

The present disclosure relates generally to Internet of Things devices, and more particularly, to dynamic device records for use in validating communications from Internet of Things devices subject to data drift.

BACKGROUND

The Internet of Things (IoT) describes a network of physical objects (or "things") that are embedded with sensors, software, and/or other technologies for the purpose of connecting and/or exchanging data with other devices and systems over a network (e.g., the Internet). These devices range from ordinary household devices to sophisticated industrial tools. For example, in the consumer market, IoT technology may include devices related to the concept of the "smart home" (including, for example, devices and appliances such as lighting fixtures, smart plugs, smart thermostats, home security systems, smart locks, refrigerators, coffee machines, and the like), wearables (including, for example, fitness tracking devices), and self-driving cars, among others. Through the use of IoT technology, it may be possible to automate many previously manual processes. For example, it may be possible to use information from sensors within a smart refrigerator to identify low inventory levels and to automatically order groceries to replenish the inventory. IoT technology also enables users to transmit/initiate electronic communications from a variety of devices beyond simply the conventional communication devices, such as laptops, tablets, and/or mobile phones. For instance, in the context of a smart refrigerator, a user who examines the contents of the refrigerator and determines that the user would like an item that is not currently stored within the refrigerator, may be able to order that item from the refrigerator itself, rather than from the user's computer or smart phone.

SUMMARY

In the context of IoT devices, smart contracts help to automate processes and to provide security to IoT device-initiated communications. A smart contract is a piece of self-executing code that is configured to execute only under predetermined conditions. As an example, a smart contract associated with a smart refrigerator may include code that is configured to execute, in response to information from sensors within the refrigerator indicating that the inventory of a given product has fallen below a particular threshold, to automatically transmit an order request for that product. As another example, a smart contract associated with a wearable device may include code that is configured to execute, in response to receiving information from the device that is used to verify the identity of the device, to transmit a request initiated by the owner of the wearable.

A key challenge to the use of smart contracts with IoT devices, however, is data drift. Data drift refers to the steady changes to the data format and semantics used by an IoT device over time. Such changes may result from software, firmware and/or hardware updates to the device, and may lead to a failure of a smart contract associated with the device to execute. For example, if the smart contract includes a condition that is satisfied if a certain value received from the IoT device is greater than a threshold, the code of the smart contract may fail to execute even if that condition is satisfied, where the smart contract expects to receive the value from the device in the form of a number expressed to two decimal places, but an update to the device has resulted in the value being expressed to only one decimal place.

This disclosure contemplates an IoT device data drift resolution tool that is configured to account for changes to data formats and semantics of an IoT device over time, as reflected in a device record that is used to validate transmissions from the device. In particular, the tool is configured to generate a dynamic record for the IoT device, which includes a set of parameters extracted from the device, and to automatically update the record to account for any device data drift affecting any of those parameters. The dynamic record may correspond to a dynamic smart contract or any other record that is associated with an IoT device and susceptible to data drift. By accounting for data drift, certain embodiments of the tool help to ensure smooth execution of any automatic processes triggered by device transmissions that are validated against the device record. In this manner, certain embodiments conserve the network bandwidth and processing resources that would otherwise be wasted if an IoT system is unable to validate transmissions from one or more IoT devices (and accordingly declines to perform actions associated with those transmissions) solely because data drift has created ambiguities and/or mismatches between the information included in the transmissions from the devices and records associated with those devices, which are used to validate the transmissions. Certain embodiments of the tool are described below.

According to an embodiment, a system includes a memory, and a hardware processor communicatively coupled to the memory. The hardware processor receives a request to register a device. In response to receiving the request to register the device, the processor extracts a set of parameters from the device, and stores a baseline record associated with the device in the memory. The baseline record includes the set of parameters. The processor also determines that an update to the device has modified the set of parameters of the device. In response to determining that the update has modified the set of parameters, the processor extracts the modified set of parameters from the device, and stores a new record associated with the device in the memory. The new record includes the modified set of parameters. The baseline record was used to validate an identity of the device prior to the processor determining that the update modified the set of parameters. The new record is used to validate the identity of the device subsequent to the processor determining that the update modified the set of parameters.

According to another embodiment, a system includes a memory and a hardware processor communicatively coupled to the memory. The memory stores a baseline record associated with a device. The baseline record includes a set of parameters that were extracted from the device. The hardware processor receives a request from the device to initiate a communication. In response to receiving the request to initiate the communication, the processor determines that an update to the device has modified the set of parameters of the device. In response to determining that the update has modified the set of parameters, the processor extracts the modified set of parameters from the device, and stores a new record associated with the device in the memory. The new record includes the modified set of parameters extracted from the device. The processor additionally uses the new record to validate the request. In response to validating the request, the processor transmits the communication.

According to a further embodiment, a system includes a memory and a hardware processor communicatively coupled to the memory. The memory stores a plurality of records associated with a device and a machine learning algorithm. The plurality of records includes a first record and a second record. The first record includes a first set of parameters extracted from the device at a first time and the second record includes a second set of parameters extracted from the device at a second time. A difference exists between the first set of parameters and the second set of parameters. The difference is a result of an update to the device. The machine learning algorithm is configured, when executed, to determine, based at least in part on the plurality of records, a probability that the update to the device was unauthorized. The hardware processor executes the machine learning algorithm to determine, based at least on the plurality of records, the probability that the update to the device was unauthorized. The processor also determines that the probability is greater than a threshold. In response to determining that the probability is greater than the threshold, the processor rejects a request transmitted by the device.

The tool described in the present disclosure may be integrated into a practical application of an IoT device validation and monitoring tool that is designed to resolve IoT device data drift while at the same time, in some embodiments, providing improved security for both IoT devices and their transmissions. In particular, the tool uses a machine learning algorithm that is trained to extract a set of parameters from a given IoT device and to store those parameters as part of a dynamic record that is used to validate communications transmitted by the device. By ensuring that subsequent communications transmitted by the device conform with the device record, certain embodiments of the tool provide enhanced security to IoT systems by helping to ensure that transmissions purporting to have originated from a given IoT device did actually come from that device, rather than from a different device that is impersonating the IoT device. At the same time, by automatically updating the device record in response to data format and/or semantic changes arising from routine upgrades to the device, certain embodiments of the tool provide technical improvements to systems that rely on IoT devices to automatically initiate various actions. For example, in embodiments in which the device records correspond to smart contracts, by automatically updating the smart contracts to reflect data format and/or semantic changes arising from device updates, certain such embodiments help to ensure continued execution of the code associated with those smart contracts. In this manner, certain embodiments conserve the computational resources otherwise expended both in identifying unintended failures in smart contract execution resulting from data drift and in remedying those failures. Similarly, certain such embodiments conserve the network bandwidth and processing resources wasted by transmissions from IoT devices that would otherwise cause execution of smart contract code, but that fail to do so because of data drift that is not reflected in the smart contract.

As another example, certain embodiments provide enhanced IoT device security by identifying potentially unauthorized updates that have been made to IoT devices (e.g., updates associated with malware, spyware, etc.). In particular, certain embodiments of the tool use a long short-term memory neural network algorithm to monitor the changes that are made to the dynamic device records over time and to identify patterns in those changes that may be indicative of unauthorized updates. In response to identifying that a likely unauthorized update has been made to a given IoT device, certain embodiments of the tool generate an alert, lock the device out of the system, prevent the device from initiating actions within the system, and/or take any other appropriate precaution to help maintain the security of the system.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
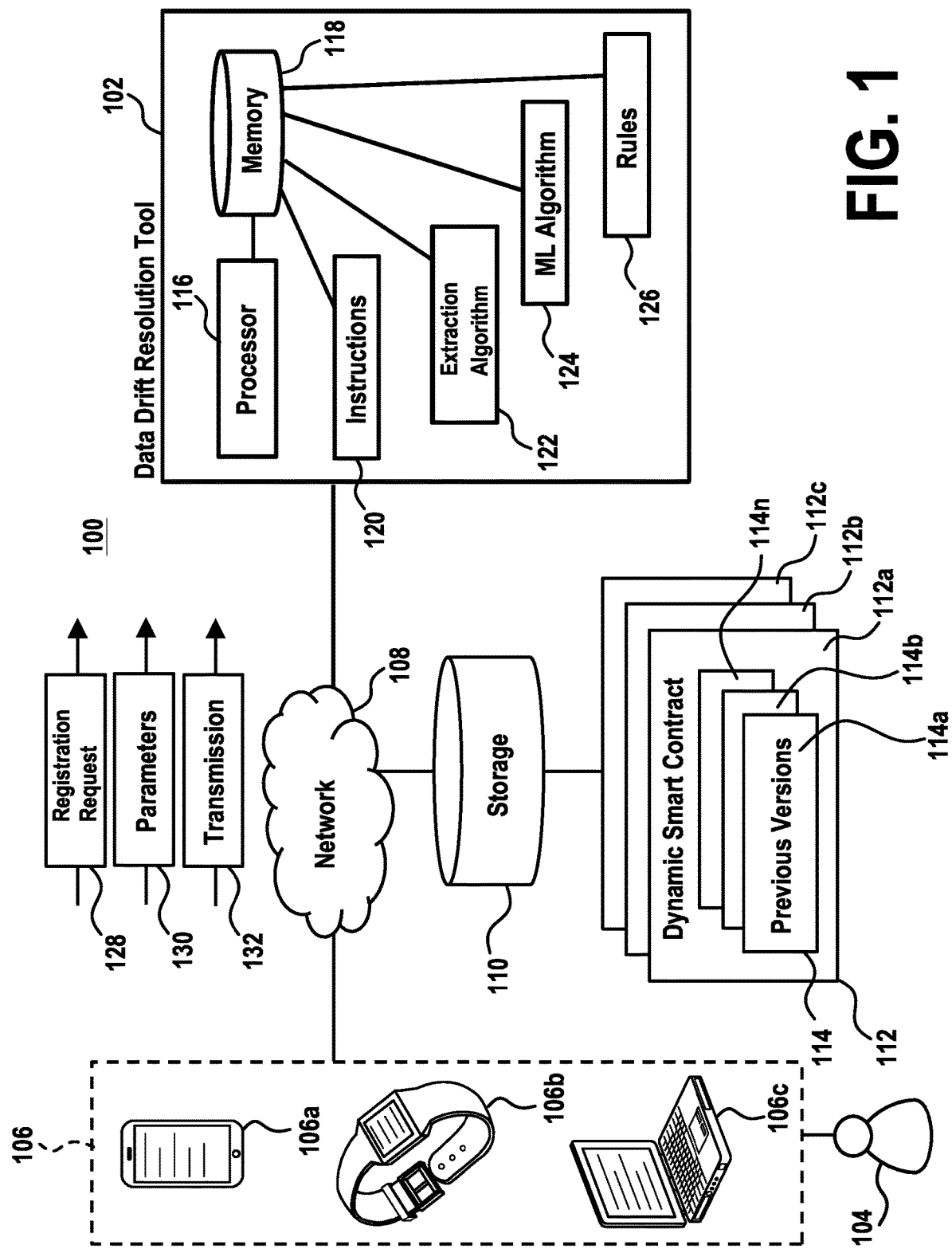
FIG. 1 illustrates an IoT device data drift resolution system.
Figure 2:
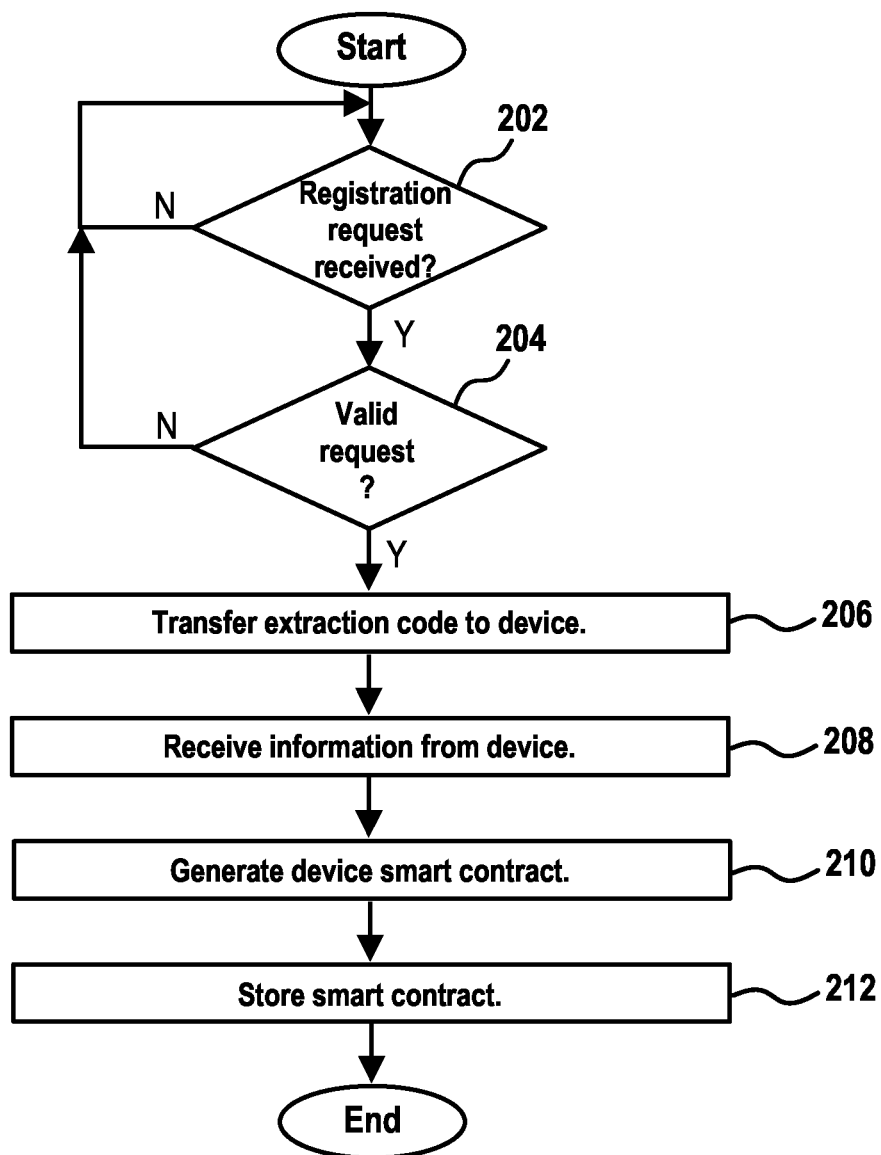
FIG. 2 presents a flowchart illustrating the manner by which the data drift resolution tool of the system of FIG. 1 registers a new IoT device.
Figure 3:
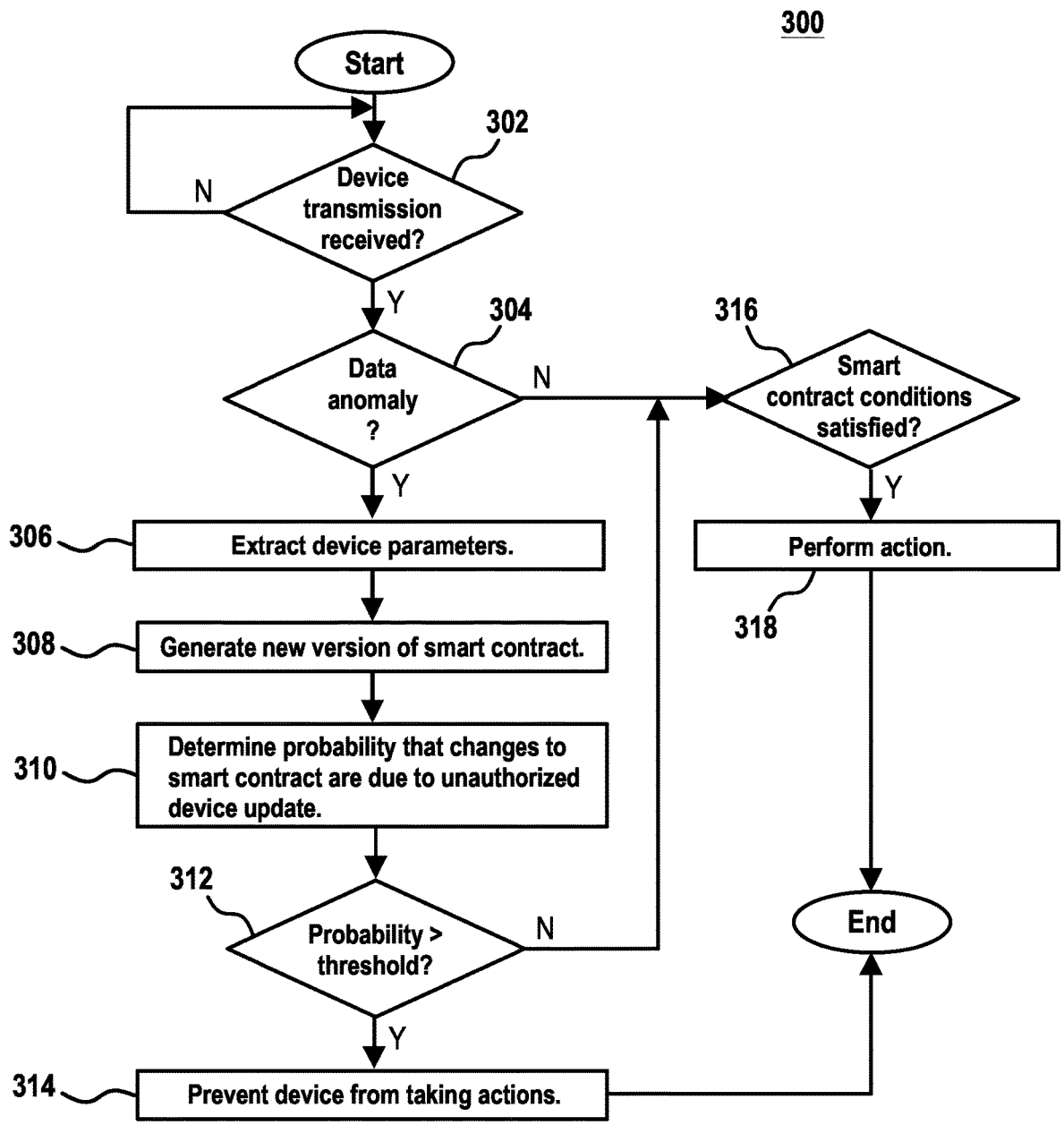
FIG. 3 presents a flowchart illustrating the operation of the data drift resolution tool of the system of FIG. 1 after an IoT device has been registered with the system.

Embodiments of the present disclosure and its advantages may be understood by referring to FIGS. 1 through 3 of the drawings, like numerals being used for like and corresponding parts of the various drawings.

I. System Overview

FIG. 1 illustrates an example data drift resolution system 100 that includes user(s) 104, devices 106, network 108, storage system 110, and data drift resolution tool 102. As illustrated in FIG. 1, for each device 106a through 106c, storage system 110 stores a dynamic record 112 assigned to the device. Each dynamic record 112 includes one or more parameters 130 extracted from the device, which are used to validate transmissions 132 sent by the device. Data drift resolution tool 102 is configured to monitor transmissions 132 sent by devices 106 and to identify any anomalies that may be the result of authorized updates to the device (e.g., software, firmware, and/or hardware updates that have modified data format(s) and/or semantics associated with the device). As an example, data drift resolution tool 102 may monitor transmissions 132 from a device 106a and identify that the format of a piece of information included in those transmissions has changed from a first format to a second format. For instance, a number include in the transmissions may have changed from being expressed to two decimal places to being expressed to only one decimal place, an image file included in the transmissions may have changed from being a JPEG file to being a TIFF file, and/or any other format change associated with information included in the transmissions may have occurred. In response to identifying an anomaly in a transmission 132 from a device 106, the tool is configured to update the dynamic record 112 assigned to the device, by updating the parameters 130 included in the record. In this manner, certain embodiments of the tool enable the continual use of records 112 to validate transmissions 132 from devices 106, despite the presence of data drift in those transmissions, arising from updates to the devices over time. Further details of the manner by which data drift resolution tool 102 performs these tasks are presented below, and in the discussion of FIGS. 2 and 3.

Device(s) 106 are any devices that are configured to send transmissions 132 over network 108. As an example, in certain embodiments, one or more of devices 106 may be an Internet of Things (IoT) device, such as a wearable device (e.g., a fitness tracker, a smart watch, etc.), a smart home device (e.g., a smart refrigerator, a smart coffee machine, etc.), an autonomous vehicle, and/or any other suitable IoT device. As another example, in some embodiments, one or more of devices 106 may be a portable computing device (e.g., a smartphone, a tablet computer, etc.), a laptop computer, a desktop computer, and/or any other suitable device capable of generating/collecting information and sending such information over network 108.

Device(s) 106 may be configured to send transmissions 132 over network 108 automatically (e.g., in response to satisfaction of a monitored condition) and/or in response to receiving input from user 104 (e.g., input requesting that the device send such transmissions). As an example, in certain embodiments in which a device 106 is a smart refrigerator, the refrigerator may be configured to monitor its inventory levels and to automatically generate transmissions 132 that may automatically initiate the placement of orders for additional products, when the inventory levels for those products have fallen below set thresholds. Similarly, in certain embodiments in which a device 106 is an autonomous vehicle, the vehicle may be configured to (1) autonomously navigate to a refueling station, (2) refuel itself, and (3) automatically generate transmissions 132 to initiate an electronic payment in response to the refueling. As another example, in certain embodiments in which device 106 is a wearable device, the device may be configured to transmit a request 132 (e.g., a request to initiate a payment, a request to initiate a communication, etc.) in response to receiving input from user 104 requesting that such request be sent.

Various updates may be made to device(s) 106 over time. Such updates may take the form of software updates, firmware updates, and/or hardware updates. Any such updates may result in changes to one or more data formats and/or data semantics associated with the device. As an example, an update to a device 106 may change the format of a number generated, stored, and/or transmitted by device (e.g., a change in the number of significant digits used to express the number, a change in the number of decimal places to which the number is expressed, etc.). As another example, an update to a device 106 may result in one or more data semantic changes. For example, an update to device 106 may remove a field of information previously included in transmissions 132 from the device, add a new field of information that was not previously included in transmissions 132 from the device, change a default value included in transmissions 132 from the device, and/or modify the information included in transmissions 132 from the device in any other manner that results in a change to the data semantics.

Updates to devices 106 may include automatic updates and/or user-initiated updates. This disclosure contemplates that, over time, updates to two or more devices 106 of the same type may lead to data format and semantics differences between the transmissions 132 from those devices. For example, consider a pair of wearable fitness devices 106 of the same make and model. Initially, these devices include the same software, hardware, and firmware. Accordingly, transmissions 132 from the devices are associated with the same data formats and semantics. However, over time, a user 104 of the first wearable fitness device may perform regular software and/or firmware updates to the device, while a user 104 of the second wearable device may neglect to perform such updates for long periods of time. Thus, changes may occur over time between the software/firmware installed on each device, resulting in transmissions 132 from the devices exhibiting data format and semantics differences.

This disclosure contemplates devices 106 being any appropriate device for sending and/or receiving information over network 108. In some embodiments, device 106 may include a display, a keypad, or other appropriate terminal equipment usable by user 104. In some embodiments, an application executed by a processor of device 106 may perform the functions described herein.

Network 108 facilitates communications between components of system 100 including, for example, devices 106, storage system 110, and/or data drift resolution tool 102. Network 108 may include any interconnecting systems capable of transmitting audio, video, signals, data, messages, or any combination of the preceding. Network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable communication link, including combinations thereof, operable to facilitate communication between components of system 100. While illustrated in FIG. 1 as a single network 108, in certain embodiments, network 108 may include multiple networks.

Storage system 110 is any storage location where device records 112 may be stored. For example, storage system 110 may correspond to one or more databases, servers, a combination of the preceding, and/or any other suitable storage location. In certain embodiments, storage system 110 includes multiple storage locations. For example, in certain embodiments, storage system 110 corresponds to a distributed ledger.

As illustrated in FIG. 1, storage system 110 stores a set of dynamic records 112. Each dynamic record 112a through 112c is assigned to a device 106a through 106c and includes a set of parameters 130 extracted from the assigned device, which are used to validate transmissions 132 from the device. For example, dynamic record 112a is assigned to device 106a and includes a set of parameters 130 that were extracted from device 106a and are used to validate transmissions 132 from device 106a. Similarly, dynamic record 112b is assigned to device 106b and dynamic record 112c is assigned to device 106c.

Dynamic records 112 are any suitable records that store parameters 130 extracted from devices 106 and that may be used to validate transmissions 132 from those devices. As an example, in certain embodiments, one or more of dynamic records 112a through 112c corresponds to a smart contract that includes one or more conditions that are dependent on the parameters 130 extracted from the corresponding device 106. The smart contract(s) may include a set of code that is configured to execute when those conditions are satisfied. Execution of the code may result in the performance of any suitable action within system 100. For example, execution of the code may cause a communication to be sent (e.g., a message, a payment, etc.).

Dynamic records 112 may store any suitable parameters 130 extracted from devices 106. As an example, the parameters 130 extracted from a given device 106a and stored as part of the dynamic record 112a assigned to that device may include: (1) one or more data formats according to which information included in transmissions 132 from the device is expected to be formatted, (2) one or more pieces of identification information associated with the device, (3) information expected to be received within the metadata of transmissions 132, (4) information used to verify the identity of the user 104 of the device (e.g., an image of the user, a voice recording of the user, a fingerprint of the user, a password, etc.), (5) data semantic information associated with the device, and/or (6) any other suitable information that may be extracted from the device.

As illustrated in FIG. 1, in certain embodiments, in addition to storing the current versions of dynamic records 112, storage system 110 may store one or more previous versions 114 of dynamic records 112. For example, storage system 110 may store a baseline version 114a of record 112a for device 106a, which corresponds to the original version of record 112a that was stored in storage system 110 when device 106a was first registered/ingested into system 100. Similarly, storage system 110 may store one or more additional records 114b through 114n for device 106a, each of which may correspond to a previous version of record 112a that was stored within storage system 110 at a time in the past.

As illustrated in FIG. 1, data drift resolution tool 102 includes processor 116 and memory 118. This disclosure contemplates processor 116 and memory 118 being configured to perform any of the functions of data drift resolution tool 102 described herein. Generally, data drift resolution tool 102 is configured to: (1) register a new device 106 with the system by (a) using extraction algorithm 122 to extract a set of parameters 130 from the device and (b) storing those parameters as part of a baseline record 112 assigned to the device; (2) monitor transmissions 132 from the device; (3) identify any anomalies in the data included in the device transmissions, which may be due to an update having been performed on the device; (4) in response to identifying an anomaly, (a) use extraction algorithm 122 to extract a new set of parameters 130 from the device, and (b) use the new set of parameters 130 to update the record 112 assigned to the device; (5) use the current version of the record 112 assigned to the device to validate transmissions 132 from the device; (6) determine, based on the historical changes made to the device record 112, the probability that an unauthorized update has been performed on the device; and/or (7) in response to determining that the probability that an unauthorized update has been performed on the device, implement one or more security precautions within system 100. The manner by which data drift resolution tool 102 performs these functions is described in further detail below, and in the discussion of FIGS. 2 and 3.

Processor 116 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 118 and controls the operation of data drift resolution tool 102. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware and software that operates to control and process information. Processor 116 executes software (e.g., instructions 120) stored on memory 118 to perform any of the functions described herein. Processor 116 controls the operation and administration of data drift resolution tool 102 by processing information received from device(s) 106, network 108, storage location(s) 110, and/or memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information/instructions 120 for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include one or more applications executable by processor 116 to perform one or more of the functions described herein.

In certain embodiments, memory 118 may also store extraction algorithm 122, machine learning algorithm 124, and/or validation rule set 126. Extraction algorithm 122 includes any suitable algorithm that is configured to extract a set of parameters from a given device 106. In certain embodiment, in response to receiving a request 128 from a device 106 seeking to register with system 100, data drift resolution tool 102 is configured to transmit extraction algorithm 122 (or a portion thereof) to the device. In certain embodiments, extraction algorithm 122 (or a portion thereof) is a self-executing piece of code that is configured, once received by device 106, to automatically extract a set of information 130 from the device and to transmit the information back to data drift resolution tool 102. In some embodiments, extraction algorithm 122 (or a portion thereof) is a piece of code that is configured to extract information 130 from device 102 once received by device 106 and in response to user 104 initiating the extraction. The information 130 extracted from device 106 and transmitted back to data drift resolution tool 102 may correspond to the set of parameters to be stored within the device record 112 assigned to the device, or may correspond to information from which the set of parameters to be stored within the device record 112 assigned to the device may be obtained. For example, in certain embodiments, in response to receive information 130 from device 106, data drift resolution tool 102 is configured to execute a portion of extraction algorithm 122 to obtain the set of parameters from the information.

Extraction algorithm 122 may be any suitable algorithm configured to extract a set of parameters from a device 106. As an example, in certain embodiments, extraction algorithm 122 is a machine learning algorithm trained to extract a suitable set of parameters from a given device 106, where the suitability of the parameters has been specified in any suitable manner. For example, in certain embodiments, memory 118 stores a validation rule set 126 that specifies parameters that have been deemed suitable by the organization to which data drift resolution tool 102 belongs for validating transmissions 132 received from a given device. For each device 106, it may be possible to extract all or only a subset of the suitable parameters specified in validation rule set 126. For example, validation rule set 126 may indicate that an image of user 104 is a suitable parameter for use in validating transmissions 132 from devices 106 that include such images as part of its transmissions. However, this parameter is only applicable to those devices 106 that transmit images as part of transmissions 132. Accordingly, extraction algorithm 122 may be trained, based on validation rule set 126 and representative transmissions from devices 106, to determine, for each type of device 106, a device-specific set of parameters 130 to extract from the device. In certain embodiments, extraction algorithm 122 may be trained to determine an optimal set of parameters 130 for use in validating device transmissions 132 that takes into account computational efficiency concerns. For example, the extraction algorithm 122 may be trained to extract a minimum number of parameters from a given device 106 such that a minimum level accuracy is achieved when using those parameters to validate transmissions 132 from the device, while at the same time conserving the computational resources that would otherwise be expended if a much larger set of parameters was used to validate the transmissions.

In embodiments in which extraction algorithm 122 is a machine learning algorithm, this disclosure contemplates that the algorithm may be any suitable machine learning algorithm. For example, extraction algorithm 122 may be a neural network algorithm, a random forest algorithm, a support vector machine, and/or any other suitable machine learning algorithm. I Machine learning algorithm 124 is configured to identify device(s) 106 for which an unauthorized update may have been made. In the context of this disclosure, an unauthorized update includes any update to device software, hardware, and/or firmware that may pose a security risk to system 100. As an example, an unauthorized update may correspond to the installation of malware and/or spyware on a given device 106. Machine learning algorithm 124 is any suitable algorithm that is configured to determine that one or more unauthorized updates have likely been made to a given device 106, based on the sequence of changes made to the device's record 112 over time (e.g., as reflected in the previous versions 114 of the device record). For example, machine learning algorithm 124 may be an algorithm that has been trained to identify patterns in the sequence of changes that have occurred for record 112, which are indicative of the presence of an unauthorized update having been made to the device. Machine learning algorithm 124 may be trained to identify such patterns in any suitable manner. For example, the algorithm may be trained using a training set that includes a plurality of sequences of changes that have been made to the records 112 of devices 106 for which it is known that the devices have undergone unauthorized updates, as well as a plurality of sequences of changes that have been made to the records 112 of devices 106 for which it is known that the devices have not undergone any unauthorized updates.

Machine learning algorithm 124 may be configured to consider any suitable information about the sequence of changes 114 that have been made to a given device's record 112 over time, in determining the likelihood that that device has undergone an unauthorized update. For example, machine learning algorithm 124 may consider timing information associated with when each change in the sequence of changes 114 occurred, information about the type and/or content of the changes that have been made to record 112 over time (as reflected in the sequence of changes 114), and/or any other information associated with the sequence of changes 114 that have been made to the device record 112.

In certain embodiments, determining that a given device 106 has likely undergone an unauthorized update includes determining a probability that the device has undergone an unauthorized update, and then comparing that probability against a specified threshold. For example, determining that a given device 106 has likely undergone an unauthorized update includes determining that the probability that the device has undergone an unauthorized update is greater than 80%. Machine learning algorithm 124 may be any suitable machine learning algorithm. For example, in certain embodiments, machine learning algorithm is a neural network algorithm. For instance, in some embodiments, machine learning algorithm is a long short-term memory neural network algorithm.

Modifications, additions, or omissions may be made to the systems described herein without departing from the scope of the invention. For example, system 100 may include any number of users 104, devices 106, networks 108, storage locations 110, dynamic device records 112, prior device records 114, processors 116, memories 118, extraction algorithms 122, machine learning algorithms 124, and validation rule sets 126. The components may be integrated or separated. Moreover, the operations may be performed by more, fewer, or other components. Additionally, the operations may be performed using any suitable logic comprising software, hardware, and/or other logic.

II. Device Registration

FIG. 2 presents a flowchart illustrating an example method 200 (described in conjunction with elements of FIG. 1) by which data drift resolution tool 102 registers a new device 106 in system 100.

During operation 202, data drift resolution tool 102 determines whether it has received a request 128 to register a new device 106 with the system. In the context of this disclosure, a "new device" is any device 106 for which a device record 112 is not stored within storage system 110. Data drift resolution tool 102 may receive request 128 in any suitable manner. For example, in certain embodiments, receiving request 128 may include receiving a secure token from the device, where the secure token was previously provided by data drift resolution tool 102 to a user 104 of the device. If, during operation 202 data drift resolution tool 102 determines that it has received a request 128 to register a new device 106, during operation 204 the tool determines whether the registration request is a valid request. For example, data drift resolution tool 102 may validate a secure token received from the device as part of request 128, and/or perform any other validation method on request 128, to determine whether the request is a valid request.

If, during operation 204 data drift resolution tool 102 determines that request 128 is a valid request, during operation 206 data drift resolution tool 102 connects to device 106 and transfers extraction algorithm 122 to the device. As described above, extraction algorithm 122 is configured to extract a set of parameters 130 from device 106 (or information from which the set of parameters 130 may be obtained) and to transmit those parameters (or information) back to the tool. The set of parameters 130 may include any suitable parameters associated with the device and/or transmissions made by the device. For example, the set of parameters 130 may include one or more data formats according to which data received from the device is expected to be formatted, data semantic information associated with the device, identification information associated with the device, metadata associated with transmissions from the device, and/or any other suitable parameters.

During operation 208 data drift resolution tool 102 receives the set of parameters 130 (or the information from which the set of parameters 130 may be obtained) from device 106. During operation 210 data drift resolution tool 102 uses the received set of parameters 130 to generate a baseline device record 112 for the device. The baseline record 112 may be any suitable record that may be used to validate transmissions 130 received from device 106. In certain embodiments, baseline device record 112 corresponds to a smart contract that includes a set of conditions that are dependent on those received parameters, as well as a set of code that is configured to self-execute in response to satisfaction of those conditions. For instance, the code may be configured to self-execute in response to determining that information included within a transmission 130 from device 106 is consistent with the set of parameters (e.g., a piece of data received as part of transmission 130 is formatted according to a format specified by the set of parameters 130. In certain embodiments, the code included in the smart contract is configured to self-execute in order to initiate an action within system 100. For example, the code may be configured to self-execute in order to initiate the transmission of a communication (including, for example, a payment).

During operation 212 data drift resolution tool 102 stores the baseline device record 112 in storage system 110. For example, in certain embodiments, data drift resolution tool 102 stores baseline record 112 in a distributed ledger. In certain embodiments, data drift resolution tool 102 stores baseline record 112 in storage system 110 according to an identifier associated with device 106. For example, data drift resolution tool 102 may store baseline record 112 in storage system 110 according to an IMSI of the device, an IP address associated with the device, an Electronic Product Code (EPC) assigned to the device, a Radio Frequency Identification (RFID) assigned to the device, and/or any other suitable identifier.

In certain embodiments multiple devices 106 may share the same device record 112. For example, a pair of devices 106 that are the same make/model and that have undergone the same set of updates may be associated with the same device record 112. In certain such embodiments, in order to conserve storage resources, data drift resolution tool 102 may store baseline record 112 in storage system 110 along with a device identifier for each device 106 assigned to that baseline record 112.

Modifications, additions, or omissions may be made to method 200 depicted in FIG. 2. Method 200 may include more, fewer, or other operations. For example, operations may be performed in parallel or in any suitable order. While discussed as data drift resolution tool 102 (or components thereof) performing certain operations, any suitable components of system 100, including, for example, devices 106, may perform one or more operations of the method.

III. Data Drift Identification and Resolution

FIG. 3 presents a flowchart illustrating an example method 300 (described in conjunction with elements of FIG. 1) used by data drift resolution tool 102 to validate transmissions 132 received from devices 106 in a manner that accounts for data drift that may arise over time from updates made to devices 106. Method 300 assumes that at least a baseline record 112 has previously been stored within the system for device 106. Such a baseline record 112 may have been generated by data drift resolution tool 102 according to method 200, illustrated in FIG. 2, or in any other suitable manner.

During operation 302 data drift resolution tool 102 monitors for transmissions 130 from device 106. If, during operation 302 data drift resolution tool 102 determines that it has received a transmission 130 from device 106, during operation 304 the tool determines whether the data included in the transmission (including data formats, data semantics, metadata, etc.) conforms with what the tool expects to receive, based on the set of parameters included in the device record 112 stored for the device. If, during operation 304 data drift resolution tool 102 determines that an anomaly exists in the data received from device 106 within transmission 130 (e.g., a value received in transmission 130 is formatted according to a first format, which is different from/inconsistent with a second format specified in the set of parameters included in device record 112), during operation 306 data drift resolution tool 102 extracts an updated set of parameters 130 from device 106. During operation 308 data drift resolution tool 102 generates an updated version of device record 112 that reflects any changes that have been made to the set of parameters of the device (for example, as a result of an update that has been made to the device).

During operation 310 data drift resolution tool 102 applies machine learning algorithm 124 to the sequence of changes 114 that have been made to the device record 112 over time, to determine a probability that the changes to the device record are a result of an unauthorized update that has been made to the device. During operation 312 data drift resolution tool 102 determines whether the probability that the changes to the device record are a result of an unauthorized update is greater than a set threshold. The value of the threshold may be any suitable value. For example, the value of the threshold may be 50%, 75%, 80%, 90%, and/or any other suitable manner.

If, during operation 312 data drift resolution tool 102 determines that the probability that the changes to the device record are a result of an unauthorized update is greater than the set threshold, during operation 314 data drift resolution tool 102 implements one or more measures to protect system 100 from security risks associated with a device that has undergone an unauthorized update. For example, in certain embodiments, data drift resolution tool 102 may lock the device out of the system, by, for example, preventing the device from taking any actions within the system. Similarly, the tool may reject any communication attempts made by the device. In some embodiments, data drift resolution tool 102 may generate an alert and transmit the alert to a user 104 to whom the device belongs.

If, during operation 312 data drift resolution tool 102 determines that the probability that the changes to the device record are a result of an unauthorized update is less than the set threshold, during operation 316 data drift resolution tool 102 determines whether the information included within the device transmission 130 are consistent with the set of parameters included in the current version of the device record 112. As an example, in certain embodiments in which device record 112 corresponds to a smart contract, during operation 316 data drift resolution tool 102 determines whether the conditions of the smart contract (which are designed to ensure consistency between the current set of parameters that have been extracted from the device and the information included within the device transmission 130) are satisfied.

If, during operation 316 data drift resolution tool 102 determines that that the information included within the device transmission 130 is consistent with the set of parameters included in the current version of the device record 112, during operation 318 data drift resolution tool 102 determines that transmission 130 has been validated. Accordingly, data drift resolution tool 102 performs (or enables another component of system 100 to perform) any action for which validated transmissions 130 from the device are designed to be initiated. For example, in certain embodiments, in response to determining that a transmission 130 from device 106 have been validated, data drift resolution tool 102 may initiate a communication (including, for example, a payment) on behalf of the device.

Modifications, additions, or omissions may be made to method 300 depicted in FIG. 3. Method 300 may include more, fewer, or other operations. For example, operations may be performed in parallel or in any suitable order. While discussed as data drift resolution tool 102 (or components thereof) performing certain operations, any suitable components of system 100, including, for example, devices 106, may perform one or more operations of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a memory; and
   a hardware processor communicatively coupled to the memory, the hardware processor configured to:
   receive a request to register a device;
   in response to receiving the request to register the device:
   extract a set of parameters from the device, wherein the set of parameters comprises a plurality of data formats associated with data transmissions sent by the device, and the plurality of data formats comprise a number format and an image file format; and
   store a baseline record associated with the device in the memory, the baseline record comprising the set of parameters;
   determine that an update to the device has modified the set of parameters of the device; and
   in response to determining that the update has modified the set of parameters:
   extract the modified set of parameters from the device;
   generate a new record associated with the device, the new record comprising the modified set of parameters;
   determine a probability that changes to the new record are a result of an unauthorized update that has been made to the device;
   determine that the probability is less than a threshold; and
   in response to determining that the probability is less than the threshold, store the new record associated with the device in the memory, wherein:
   the baseline record was used to validate an identity of the device prior to determining that the update modified the set of parameters; and
   the new record is used to validate the identity of the device subsequent to determining that the update modified the set of parameters.

2. The system of claim 1, wherein extracting the set of parameters from the device comprises transferring a software program to the device, wherein the software program is configured, when executed on the device, to:
   extract the set of parameters from the device; and
   transmit the set of parameters to the hardware processor.

3. The system of claim 1, wherein receiving the request to register the device comprises receiving a secure token from the device.

4. The system of claim 1, wherein storing the baseline record in the memory comprises storing the baseline record in a distributed ledger.

5. The system of claim 1, wherein:
   using the baseline record to validate the identity of the device comprises:
   receiving a first transmission from the device; and
   determining that the first transmission is consistent with the set of parameters; and
   using the new record to validate the identity of the device comprises:
   receiving a second transmission from the device; and
   determining that the second transmission is consistent with the modified set of parameters, wherein the second transmission is not consistent with the set of parameters.

6. The system of claim 1, wherein each of the baseline record and the new record comprises a smart contract.

7. A method comprising:
   receiving a request to register a device;
   in response to receiving the request to register the device:
   extracting a set of parameters from the device, wherein the set of parameters comprises a plurality of data formats associated with data transmissions sent by the device, and the plurality of data formats comprise a number format and an image file format; and
   storing a baseline record associated with the device in a memory, the baseline record comprising the set of parameters;
   determining that an update to the device has modified the set of parameters of the device; and
   in response to determining that the update has modified the set of parameters:
   extracting the modified set of parameters from the device;
   generating a new record associated with the device, the new record comprising the modified set of parameters;
   determining a probability that changes to the new record are a result of an unauthorized update that has been made to the device;
   determining that the probability is less than a threshold; and
   in response to determining that the probability is less than a threshold, storing the new record associated with the device in the memory, wherein:
   the baseline record was used to validate an identity of the device prior to determining that the update modified the set of parameters; and
   the new record is used to validate the identity of the device subsequent to determining that the update modified the set of parameters.

8. The method of claim 7, wherein extracting the set of parameters from the device comprises transferring a software program to the device, wherein the software program is configured, when executed on the device, to:
extract the set of parameters from the device; and
transmit the set of parameters.

9. The method of claim 7, wherein receiving the request to register the device comprises receiving a secure token from the device.

10. The method of claim 7, wherein storing the baseline record in the memory comprises storing the baseline record in a distributed ledger.

11. The method of claim 7, wherein:
using the baseline record to validate the identity of the device comprises:
receiving a first transmission from the device; and
determining that the first transmission is consistent with the set of parameters; and
using the new record to validate the identity of the device comprises:
receiving a second transmission from the device; and
determining that the second transmission is consistent with the modified set of parameters, wherein the second transmission is not consistent with the set of parameters.

12. The method of claim 7, wherein each of the baseline record and the new record comprises a smart contract.

13. A non-transitory computer-readable medium comprising instructions that, when executed by a hardware processor, cause the processor to:
receive a request to register a device;
in response to receiving the request to register the device:
extract a set of parameters from the device, wherein the set of parameters comprises a plurality of data formats associated with data transmissions sent by the device, and the plurality of data formats comprise a number format and an image file format; and
store a baseline record associated with the device in a memory, the baseline record comprising the set of parameters;
determine that an update to the device has modified the set of parameters of the device; and
in response to determining that the update has modified the set of parameters:
extract the modified set of parameters from the device;
generate a new record associated with the device, the new record comprising the modified set of parameters;
determine a probability that changes to the new record are a result of an unauthorized update that has been made to the device;
determine that the probability is less than a threshold; and
in response to determining that the probability is less than a threshold, store the new record associated with the device in the memory, wherein:
the baseline record was used to validate an identity of the device prior to determining that the update modified the set of parameters; and
the new record is used to validate the identity of the device subsequent to determining that the update modified the set of parameters.

14. The non-transitory computer-readable medium of claim 13, wherein extracting the set of parameters from the device comprises transferring a software program to the device, wherein the software program is configured, when executed on the device, to:
extract the set of parameters from the device; and
transmit the set of parameters to the hardware processor.

15. The non-transitory computer-readable medium of claim 13, wherein receiving the request to register the device comprises receiving a secure token from the device.

16. The non-transitory computer-readable medium of claim 13, wherein:
storing the baseline record in the memory comprises storing the baseline record in a distributed ledger; and
each of the baseline record and the new record comprises a smart contract.

17. The non-transitory computer-readable medium of claim 13, wherein:
using the baseline record to validate the identity of the device comprises:
receiving a first transmission from the device; and
determining that the first transmission is consistent with the set of parameters; and
using the new record to validate the identity of the device comprises:
receiving a second transmission from the device; and
determining that the second transmission is consistent with the modified set of parameters, wherein the second transmission is not consistent with the set of parameters.

* * * * *